US005551727A

United States Patent [19]
Speich

[11] Patent Number: 5,551,727
[45] Date of Patent: Sep. 3, 1996

[54] VEHICLE STEERING COLUMNS

[75] Inventor: Gerald A. Speich, Warwickshire, England

[73] Assignee: The Torrington Company, Torrington, Conn.

[21] Appl. No.: 304,467

[22] Filed: Sep. 12, 1994

[30] Foreign Application Priority Data

Sep. 20, 1993 [GB] United Kingdom ............. 9319397

[51] Int. Cl.⁶ ..................................................... B62D 1/11
[52] U.S. Cl. ............................................. 280/777; 188/374
[58] Field of Search ............................... 280/775, 777; 74/492, 493; 188/374

[56] References Cited

U.S. PATENT DOCUMENTS

| 3,822,608 | 7/1974 | Murase et al. | 74/493 |
| 3,835,725 | 9/1974 | Furusho et al. | 74/492 |
| 4,287,786 | 9/1981 | Bertginski | 74/492 |
| 4,445,708 | 5/1984 | Oakes | 280/777 |
| 4,674,354 | 6/1987 | Brand | 74/492 |
| 4,943,028 | 7/1990 | Hoffmann et al. | 280/777 |
| 5,375,881 | 12/1994 | Lewis | 188/374 |

FOREIGN PATENT DOCUMENTS

| 2995577 | 4/1979 | Australia . |
| 0458456 | 11/1991 | European Pat. Off. . |
| 1501472 | 11/1967 | France . |
| 737959 | 10/1955 | United Kingdom . |
| 1329456 | 9/1973 | United Kingdom . |
| 1503656 | 3/1978 | United Kingdom . |
| 1576754 | 10/1980 | United Kingdom . |
| 2252084 | 7/1992 | United Kingdom . |
| WO-A-9304904 | 3/1993 | WIPO . |

Primary Examiner—Karin L. Tyson
Attorney, Agent, or Firm—Michael H. Minns

[57] ABSTRACT

A vehicle steering wheel lock housing is mounted as an interference fit on the end of a steering column which has an extended slot. The lock housing has an internal peg which slides in the slot and is spaced from the inner end of it. In the event of vehicle crash, the lock housing is driven further down the slot continuing to be loaded as a result of the interference fit, the tube closing around the slot after the tube has passed the peg. Instead of the steering lock housing, another tubular member could be mounted on the end of a steering column to achieve the required collapse facility.

7 Claims, 2 Drawing Sheets

VEHICLE STEERING COLUMNS

BACKGROUND OF THE INVENTION

This invention relates to a vehicle steering column and in particular to means to absorb energy transmitted through a steering column in the event of a vehicle crash and/or driver impact on a steering wheel.

In many steering columns, a steering wheel lock is press fitted onto the end of an outer tube of the steering column and in use the steering lock engages with a series of castalations on the steering wheel to lock it.

A known problem has been of how to absorb chest impact energies of a driver in a vehicle which has a rake/reach or tilting steering column. Existing constructions include crushing or extending a convoluted tube, which have the problem of relatively high tool cost and low natural frequency. Other known constructions tend to move the energy absorbing mechanism away from the driver and/or involve additional components.

Energy imparted by the driver on the steering wheel in the event of impact is transmitted from the steering wheel down the steering column. With an adjustable steering column, it will be appreciated that the steering column can be moved up and down and in and out relative to supporting bracketry remote from the steering wheel and this prevents the use of a fixed energy absorbing portion between the steering wheel and supporting bracketry.

The foregoing illustrates limitations known to exist in present steering column energy absorbing mechanisms. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing in combination: a vehicle steering column including at least one steering column member and a steering wheel; and a means for absorbing energy, the means comprising a tubular member in sliding engagement about one of said at least one steering column members, the tubular member sliding from a first position to a second position in the event of a driver impact on the vehicle steering column.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
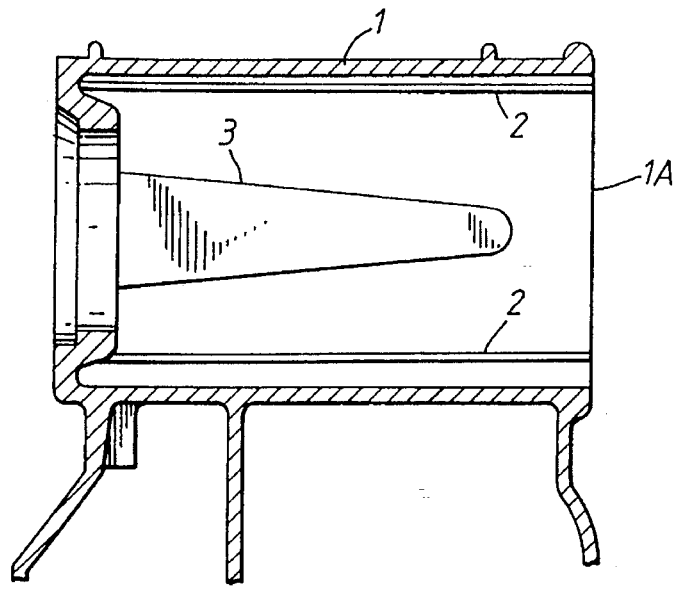
FIG. 1 is a diagrammatic sectional side view of part of a known form of steering wheel lock housing.

FIG. 1 shows part of the known steering wheel lock housing 1, which is basically tubular in form with crush ribs 2 located in its bore. A tapered peg 3 is also provided in the bore of the steering lock housing 1. The steering wheel lock mechanism is not shown and is generally attached to the downward extending portions of the steering wheel lock housing.

Figure 2:
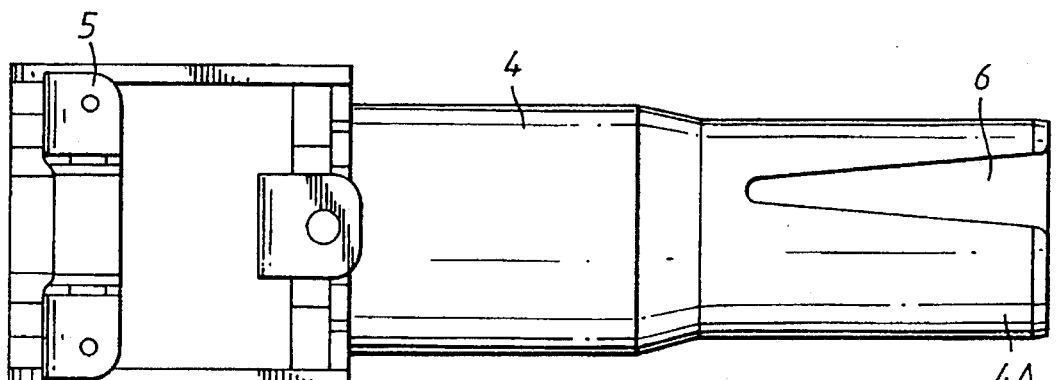
FIG. 2 is a diagrammatic underneath view of one end of an outer tube of a known form of steering column adapted to receive the steering wheel lock housing of FIG. 1.
Figure 3:
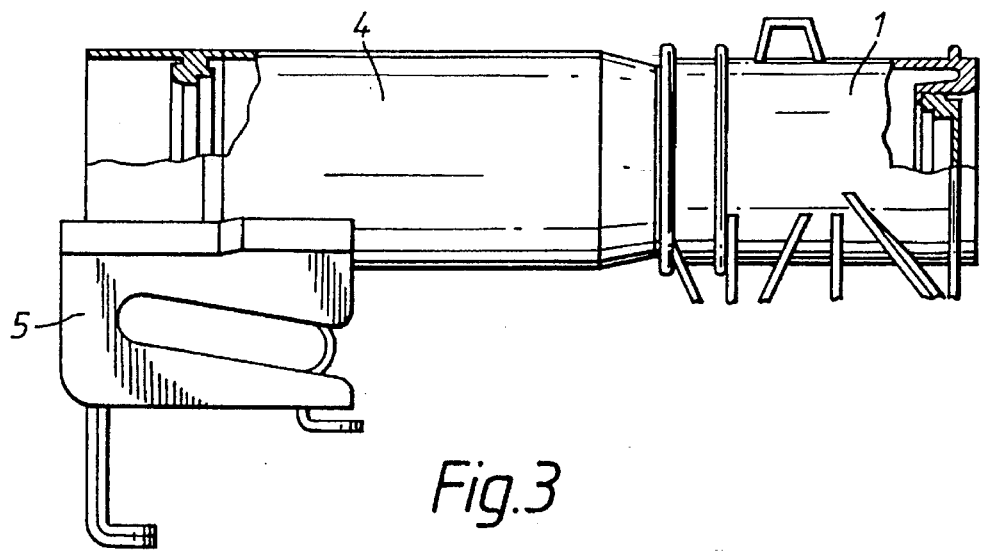
FIG. 3 is a diagrammatic side view of the steering column outer tube of FIG. 2 with the steering wheel lock housing of FIG. 1 mounted thereon.

FIG. 2 shows the known steering column outer tube 4 which has supporting bracketry 5 and a tapered slot 6 at the end of the steering column adjacent the steering wheel (not shown).

The end 1A of the steering wheel lock housing 1 is press fitted onto the end 4A of the steering column outer tube 4 so that the tapered peg 3 locates in the slot 6 and the ribs 2 are crushed by the tube 4. The peg 3 and slot 6 arrangement transmits torque exerted on the lock mechanism, during attempted theft, to the steering column bracketry 5. The peg 3 is fully seated in the slot 6.

According to one aspect of the present invention, there is provided a vehicle steering column having a steering wheel lock and housing, the lock housing and column, in combination, incorporating means to absorb energy transmitted from the steering wheel in the event of driver impact on the steering wheel.

According to another aspect of the present invention, there is provided a vehicle steering column having a member fitted on the end of the steering column on which the steering wheel is mounted, the member and column, in combination, incorporating means to absorb energy transmitted from the steering wheel in the event of driver impact on the steering wheel.

Figure 4:
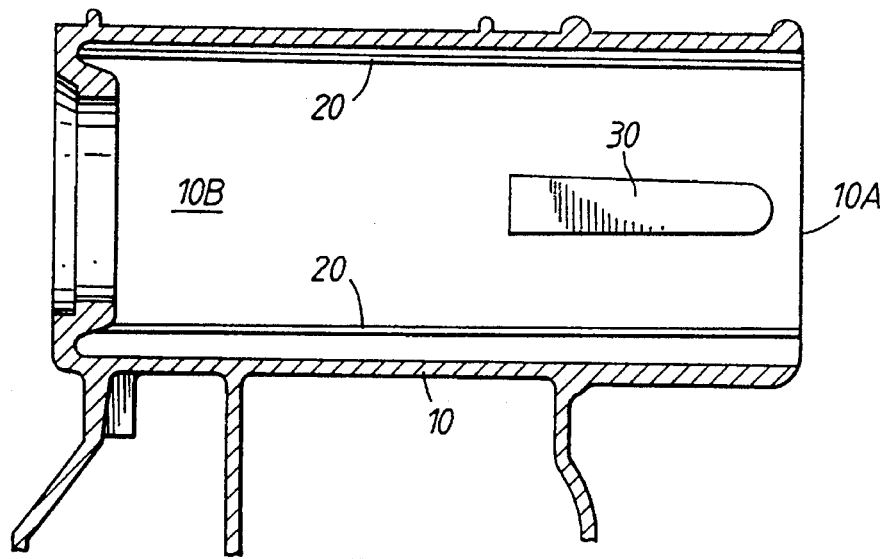
FIG. 4 is a view similar to FIG. 1 but showing part of a vehicle steering wheel lock housing according to the present invention.

Referring to FIG. 4, the present vehicle steering wheel lock housing 10 has a tubular body which is provided with an extended bore as compared with known steering wheel lock housings, the bore being extended to accommodate the length of stroke of collapse of the steering wheel required. The bore is slightly tapered. As with the known type of vehicle steering wheel lock housing, internal crush ribs 20 are provided, which are also given a slight taper as is a short, internal peg 30. The area indicated by reference 10B is also relieved to allow for tool removal during manufacture, since the lock housing 10 can be molded or die cast.

Figure 5:
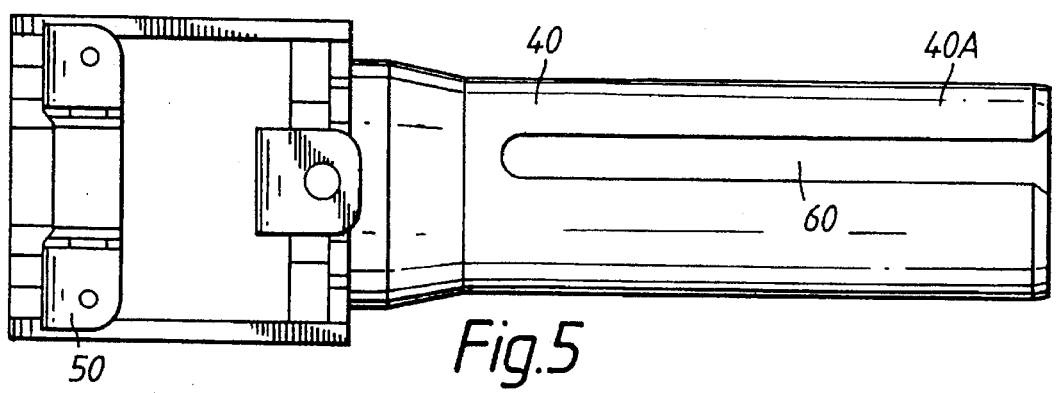
FIG. 5 is a view similar to FIG. 2 but showing one end of an outer tube of a vehicle steering column according to the present invention.
Figure 6:
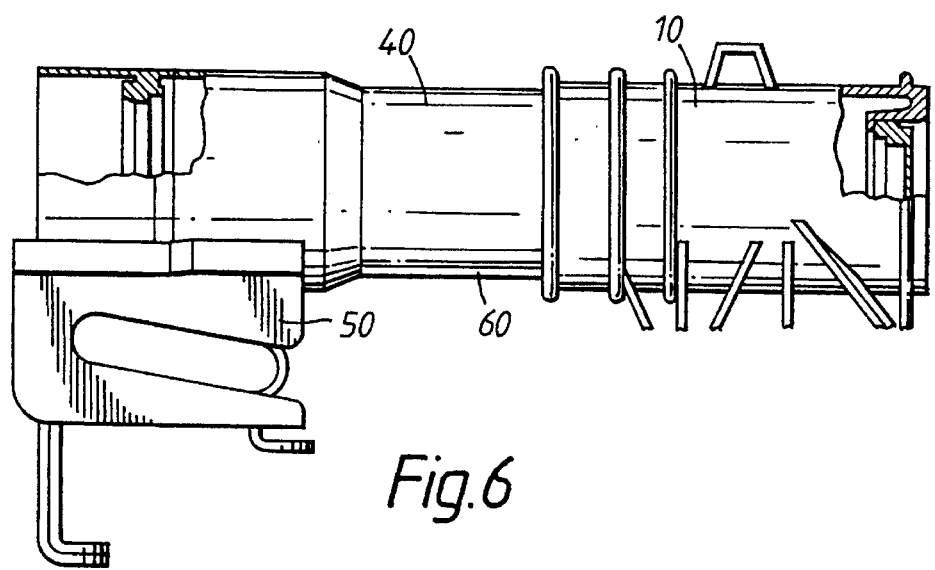
FIG. 6 is a view of the outer tube of FIG. 5 with the steering lock housing of FIG. 4 mounted thereon.

As seen in FIG. 5, the present vehicle steering column has an extended outer tube 40, again with supporting bracketry 50, the end 40A of the outer tube 40 being provided with an extended slot 60, of parallel section to allow the tube 40 to slide fully into the lock housing 10. Again, it is the end 10A of the lock housing into which the outer tube 40 is introduced.

As with the known form, as the tube 40 is inserted in the lock housing 10, the internal ribs 20 are crushed and the tapered bore 20 and peg 30 cause the lock housing 10 to come into interference fit with the outside of the outer tube 40. The load on the interference fit can be easily adjusted or tuned by modifying the bore and peg form and/or taper relationship with the outside of the tube 40. A typical load of the lock housing 10 as pushed onto the tube 40 in its normal position is approximately 2–5 Kn.

When located in its normal position, the peg 30 will still lie some distance from the inner end of the slot 60.

In the event of a vehicle crash, for example, the lock housing 10 is driven further down the slot 60, continuing to be loaded at the 2–5 Kn level (depending on the type of vehicle) until reaching the end of its travel. By limiting the length of the peg 30, a substantially constant load can be achieved, as once the tube has passed about the peg 30, the tube 40 will close in around the slot 60. The expectations of collapse, i.e. the shape of the designed collapse curve, can, however, be modified to suit individual applications depending on peg length and/or angle, bore rib taper and form, tube diameter and taper, etc.

The tendency on collapse is for the tube 40 not to remain circular when pressed into the lock housing 10 but rather it becomes ellipsoid in the region of the ribs 20 and the main bore of the lock housing 10.

It will be appreciated that the present steering column and lock housing in combination provides an energy absorbing mechanism which utilizes existing components, with minor added material cost as compared with known constructions, which makes it suitable for use on all types of steering column.

The lock housing and/or tube combination can be made of steel, plastics material or any other suitable material.

In order further to control the collapse curve, additional energy absorbing mechanisms can be incorporated in the combination, for example, balls or spring clips.

It will be appreciated that, instead of the steering lock housing, another tubular member could be mounted on the end of the steering column and be constructed in the same or similar manner to achieve the required collapse facility according to the invention. For example, the member could be a bearing carrier for the adjacent steering wheel and/or inner steering column shaft.

Having described the invention, what is claimed is:

1. A vehicle steering column comprising:

at least one steering column member;

a means for absorbing energy, the means comprising a steering wheel lock housing including a tubular member in sliding engagement about one of said at least one steering column members, the one of said at least one steering column members having an open-ended axially extending slot therein, the tubular member having a radially inward projecting peg, there being an interference fit between the peg and the slot, the steering wheel lock housing having an installed position wherein the peg is spaced from the end of the slot, and in the event of a vehicle crash, the steering wheel lock housing sliding from the installed position with the peg sliding towards the closed end of the slot.

2. The vehicle steering column according to claim 1, further comprising:

a means for, in the event of a vehicle crash, causing the tubular member to close in around the slot after the tubular member has passed the peg.

3. The vehicle steering column according to claim 1, wherein the bore of the tubular member is tapered.

4. The vehicle steering column according to claim 1, wherein the tubular member has a plurality of internal crush ribs.

5. The vehicle steering column according to claim 4, wherein the internal crush ribs are tapered.

6. The vehicle steering column according to claim 1, wherein the peg is tapered.

7. A vehicle steering column comprising:

at least one steering column member;

a means for absorbing energy, the means comprising a steering wheel lock housing including a tubular member in sliding engagement about one of said at least one steering column members, the bore of the tubular member being tapered, the tubular member having a plurality of tapered internal crush ribs, the one of said at least one steering column members having an open-ended axially extending slot therein, the tubular member having a radially inward projecting tapered peg, there being an interference fit between the peg and the slot, the steering wheel lock housing having an installed position wherein the peg is spaced from the closed end of the slot, and in the event of a vehicle crash, the steering wheel lock housing sliding from the installed position with the peg sliding towards the closed end of the slot.

* * * * *